United States Patent [19]

Kuwano

[11] Patent Number: 6,119,132

[45] Date of Patent: Sep. 12, 2000

[54] ELECTRONIC IMAGE FILING SYSTEM FOR ASSIGNING AN IDENTIFIER TO AN ELECTRONIC REPRESENTATION, WHEREIN THE IDENTIFIER COMPRISES AN IMAGE IDENTIFIER CORRESPONDING TO THE IMAGE AND A PREDETERMINED APPARATUS IDENTIFIER CORRESPONDING TO THE FILING APPARATUS

[75] Inventor: Hideyuki Kuwano, Kadoma, Japan

[73] Assignee: Matsushita Electrical Industrial Co., Ltd., Osaka-fu, Japan

[21] Appl. No.: 09/017,448

[22] Filed: Feb. 2, 1998

[30] Foreign Application Priority Data

Feb. 7, 1997 [JP] Japan .................................... 9-025127

[51] Int. Cl.⁷ .................................................. G06F 17/30
[52] U.S. Cl. ......................... 707/205; 707/104; 707/200; 707/500; 707/6; 358/261.1; 358/407; 358/409; 358/426; 358/428; 358/468; 358/500; 358/520
[58] Field of Search .................................. 707/205, 200, 707/500, 104; 348/14; 358/426, 261.1, 428, 500, 520, 468, 409, 407

[56] References Cited

U.S. PATENT DOCUMENTS

| | | | |
|---|---|---|---|
| 4,937,662 | 6/1990 | Matsunawa et al. | 358/75 |
| 5,027,421 | 6/1991 | Kanno | 382/47 |
| 5,029,016 | 7/1991 | Hiyama et al. | 358/403 |
| 5,124,789 | 6/1992 | Hiyama et al. | 348/74 |
| 5,146,351 | 9/1992 | Maehara | 358/448 |
| 5,177,625 | 1/1993 | Nakashima et al. | 358/468 |
| 5,177,775 | 1/1993 | Yoichi et al. | 378/98.2 |
| 5,191,525 | 3/1993 | LeBrun et al. | 707/500 |
| 5,231,482 | 7/1993 | Murakami et al. | 358/500 |
| 5,319,471 | 6/1994 | Takei et al. | 358/451 |
| 5,327,254 | 7/1994 | Daher | 358/426 |
| 5,608,874 | 3/1997 | Ogawa et al. | 709/246 |
| 5,678,046 | 10/1997 | Cahill et al. | 707/200 |
| 5,781,310 | 7/1998 | Nakamura et al. | 358/468 |
| 5,838,926 | 11/1998 | Yamagishi | 709/249 |

FOREIGN PATENT DOCUMENTS

| | | | |
|---|---|---|---|
| 0 435 254 A2 | 7/1991 | European Pat. Off. | H04N 1/21 |
| 0 817 461 A2 | 1/1998 | European Pat. Off. | H04N 1/21 |
| 61-61495 | 3/1986 | Japan . | |
| 60-219769 | 9/1987 | Japan | G11B 27/00 |

Primary Examiner—Hosain T. Alam
Assistant Examiner—Jean M. Corrielus
Attorney, Agent, or Firm—Sheridan Ross P.C.

[57] ABSTRACT

An apparatus ID as an identifier of a filing apparatus is previously assigned to the filing apparatus, and an image ID as an identifier of an image and the apparatus ID are assigned to information to be registered, and thereby the information is managed. A registration sheet is prepared in order that a user can grasp the contents of the registered information, and an ID image pattern formed by patterning a data ID comprising the apparatus ID and the image ID is superimposed on the registration sheet. In extracting the registered information, the registration sheet is read and the ID image pattern is converted into the data ID, then the filing apparatus in which the information is registered is identified based on the apparatus ID included in the data ID, and the registered information is extracted therefrom.

15 Claims, 17 Drawing Sheets

F I G. 5

42 : APPARATUS MANAGEMENT TABLE

| APPARATUS ID | NETWORK ADRESS |
|---|---|
| 0 0 0 1 | x x. x x. x x. x 1 |
| 0 0 0 2 | x x. x x. x x. x 2 |
| 0 0 0 3 | x x. x x. x x. x 3 |

F I G. 8
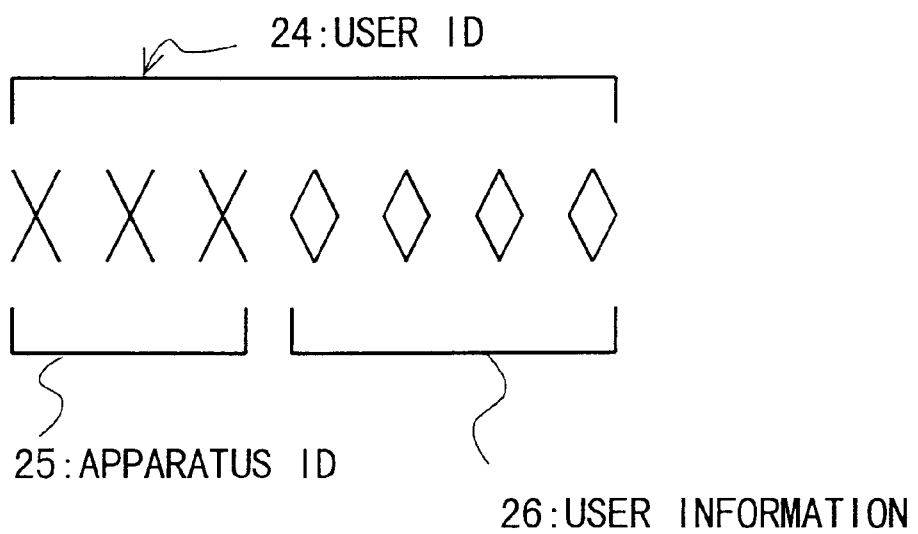

F I G. 16

45: IMAGE DATA MANAGEMENT TABLE

| USER ID | MEDIA ID | IMAGE ID | FILE SIZE | |
|---|---|---|---|---|
| x x 1 | H D | x x x 1 | * * * * | |
| x x 2 | P D x x 1 | x x x 2 | * * * * | |
| x x 3 | P D x x 2 | x x x 3 | * * * | |

ELECTRONIC IMAGE FILING SYSTEM FOR ASSIGNING AN IDENTIFIER TO AN ELECTRONIC REPRESENTATION, WHEREIN THE IDENTIFIER COMPRISES AN IMAGE IDENTIFIER CORRESPONDING TO THE IMAGE AND A PREDETERMINED APPARATUS IDENTIFIER CORRESPONDING TO THE FILING APPARATUS

BACKGROUND OF THE INVENTION

The present invention relates to a filing system for handling digitized image data, and more particularly, to a simplified filing apparatus dispensing with a sophisticated retrieving function although having image data storage and extraction functions.

With development of digital technology in general, image data is recorded not only by being printed onto paper but also by being stored on optical disks or magneto-optical disks as files. A prior art reference related to a filing function for storing image data on an optical disk or a magneto-optical disk as a file is disclosed in Japanese Laid-open Patent Application Sho 62-219769. According to this prior art, in storing the image data on the optical disk or the magneto-optical disk, a predetermined identifier (hereinafter, referred to as ID) is assigned to the file of the image data to be stored and the ID is coded by use of a code such as a bar code so that a known machine is capable of identifying the code. The code is superimposed on the image data so as to be placed at a predetermined position on the first page of the image data, and a registration sheet carrying the code is produced in order that the user can grasp the contents of the image data.

When the stored image data is extracted, the registration sheet is read out by a scanner, etc. and the code on the registration sheet is converted into the ID. By identifying the file based on the ID, target image data can be easily extracted.

Since digitized image data includes a large quantity of information, large-capacity removable recording media such as optical disks or magneto-optical disks have been frequently used for storing the image data. However, large-capacity removable recording media have a weak point in that the access speed is low. On the contrary, a hard disk has a great access speed. Therefore, hard disks, which have been increasing in capacity and decreasing in price, are more and more frequently used as recording media.

Conventionally, the filing function has been provided in filing apparatuses specifically designed for that purpose. In recent years, with rapid growth of complex digital apparatuses having a combined function which includes those of a digital copying apparatus, a facsimile apparatus and a printer, etc., a filing function is more frequently incorporated in complex digital apparatuses as a function thereof. Recently, together with the installation of a plurality of complex digital apparatuses each having a filing function in one office, when image data of a user is stored in a recording medium such as a hard disk, a situation is liable to arise that the user can not identify which one of the complex digital apparatuses stores the data in it's recording medium corresponding to the registration sheet of desired image data. Also, there is a problem as to ease of access to the desired image data. In addition, there is a problem with the security and confidentiality of the image data because anyone having the registration sheet can easily extract the image data.

In order to solve the above-mentioned problems, an object of the present invention is to provide a filing apparatus wherein desired information stored in one of a plurality of recording media is easily accessed and confidentiality is securable.

BRIEF SUMMARY OF THE INVENTION

A filing apparatus according to an aspect of the present invention comprises: image reading means for reading an image of a manuscript with optical means and outputting image data; image storage means for storing the image data read by the image reading means in an external storage device; and an encoder for generating an ID-image pattern by forming a data ID into an image pattern, the data ID being a data identifier including an image ID as an identifier assigned to the above-mentioned image data and an apparatus ID as an identifier previously assigned to each of a plurality of filing apparatuses. Moreover, the filing apparatus comprises: image superimposition means for superimposing the ID-image pattern and the pattern of the image information representative of a characteristic of the image; a decoder for performing conversion for obtaining an original data ID from the ID-image pattern superimposed by the image superimposition means; and document management means for managing a document stored in the image storage means by linking the image data with the data ID. Further, the filing apparatus comprises: image output means for reading image data including the ID-image pattern with the image reading means, obtaining a data ID of the read image data with the decoder, identifying a document with the document management means based on the data ID and outputting image data of the document corresponding to the data ID stored in the image storage means.

The ID-image pattern in which the data ID comprising the apparatus ID of the apparatus storing the image data therein and the image ID assigned to the image data is formed into an image pattern is superimposed on an image so that the user can grasp the image data stored in the disk device. With this feature, the filing apparatus storing the image data therein can be identified even when it is uncertain which filing apparatus stores the image data therein, so that access to the image data is facilitated.

The filing apparatus further comprises: management information storage means for storing management information on connections between the filing apparatus and at least one other filing apparatus; and communication means for performing communication with the another filing apparatus. When an apparatus ID of a predetermined filing apparatus does not coincide with an apparatus ID included in a data ID, the other filing apparatus corresponding to the apparatus ID included in a data ID is identified from the apparatus ID included in the data ID and the management information, and communication is performed. Image data corresponding to an image ID included in the data ID is extracted from the other filing apparatus. The image data is transmitted to the predetermined filing apparatus and is output from the image output means of the predetermined filing apparatus.

By connecting plural filing apparatuses by a network, etc. and providing information on the other connected apparatuses as management information, the image data stored in the other filing apparatuses can be extracted from the filing apparatus used by the user.

A filing apparatus according to another aspect of the present invention comprises: image reading means for reading an image of a manuscript with optical means and outputting image data; image storage means for storing the image data read by the image reading means in an external storage device; an encoder for generating an ID-image pattern by forming a data ID into an image pattern, the data ID including an image ID which is assigned to the above-mentioned image data and an apparatus ID which is previously assigned to each of a plurality of filing apparatuses. The filing apparatus further comprises: image superimposition means for superimposing the ID-image pattern with image information representative of a characteristic of the image; a decoder for converting the ID-image pattern superimposed by the image superimposition means into a data ID; and document management means for managing a document stored in the image storage by linking the image data with the data ID. The filing apparatus further comprises: image output means for reading image data including the ID-image pattern by the image reading means, obtaining a data ID of the read image data by the decoder, identifying a document by the data ID and the document management means and outputting image data of the document corresponding to the data ID stored in the image storage means; user identification means for identifying a user based on a user ID comprising user information particular to each user and an apparatus ID of a filing apparatus in which the user is registered; and access management means for limiting access to the image data stored in the image storage means based on the user information included in the user ID.

By limiting the range of access to the image data stored in the image storage means based on the user information of the user ID, the confidentiality of the stored image data is secured.

The filing apparatus further comprises: management information storage means for storing management information on connections with at least one other filing apparatus; and communication means for performing communication with the other filing apparatus. When an apparatus ID of a predetermined filing apparatus does not coincide with an apparatus ID included in a data ID, the other filing apparatus corresponding to the apparatus ID included in the data ID is identified from the apparatus ID included in the data ID and the management information, and communication is performed. Image data corresponding to an image ID included in the data ID is extracted from the other filing apparatus. The image data is transmitted to the predetermined filing apparatus and is output from the image output means of the predetermined filing apparatus.

By providing the management information on connection between the filing apparatuses and a network, etc., the filing apparatus storing desired image data therein can be identified based on the management data even when it is uncertain which filing apparatus stores the desired image data. Even when the filing apparatus storing the desired image data therein is located away from the user, by transmitting the desired image data to a filing apparatus in the vicinity of the user, the desired image data can be easily extracted from the filing apparatus. When the filing apparatus in the vicinity of the user cannot be used by the user because it is used by another user, by transmitting the desired image data to a filing apparatus in another place, the desired image can be extracted from the filing apparatus.

A filing apparatus according to yet another aspect of the present invention comprises: image reading means for reading an image of a manuscript with optical means and outputting image data; image storage means for storing the image data read by the image reading means in an external storage device; and an encoder for generating an ID-image pattern by forming a data ID into an image pattern, the data ID including an image ID which is assigned to the above-mentioned image data and an apparatus ID which is previously assigned to each of a plurality of filing apparatuses. The filing apparatus further comprises: image superimposition means for superimposing the ID-image pattern with image information representative of a characteristic of the image; a decoder for converting the ID-image pattern superimposed by the image superimposition means into a data ID; and document management means for managing the image data stored in the image storage means by linking the image data with the data ID. The filing apparatus further comprises: image output means for reading image data including the ID-image pattern from the image reading means, obtaining a data ID of the read image data by the decoder, identifying a document by the data ID and the document management means and outputting image data of the document corresponding to the data ID stored in the image storage means; user identification means for identifying a user based on a user ID comprising user information particular to each user and an apparatus ID of a filing apparatus in which the user is registered; management information storage means for storing therein management information on connections with at least one other filing apparatus; and communication means for performing communication with the other filing apparatus. When the apparatus ID included in the user ID is different from an apparatus ID of a predetermined filing apparatus, communication with the other filing apparatus having an apparatus ID included in the user ID is performed based on management information on connection with the other filing apparatus, and image data read from the image reading means of the predetermined filing apparatus is stored in the image storage means of the other filing apparatus.

By providing the apparatus ID of the filing apparatus in which the user is registered and the management information on connections between the filing apparatuses and a network, etc., image data can be registered in the filing apparatus in which the user is registered even by a filing apparatus in which the user is not registered.

In the filing apparatus according to the present invention, the above-mentioned image storage means comprises: a storage device using a fixed disk unit and a removable recording medium; and disk management means for managing a medium storing the image data therein in a manner that the image ID of the image data corresponds with the media ID which is assigned for identifying a type of the storage device and the removable recording medium.

By managing the image ID of the image data and the type of the storage device or the media ID of the removable recording medium storing the image data therein with correspondence with each other, it is determined which fixed disk unit or which of a plurality of removable recording media stores the image data, so that the handling of a large-amount of data is facilitated.

In the filing apparatus according to the present invention, the above-mentioned user identification means has an input device selected from among a magnetic card reader, a keyboard and a touch screen.

The user's identification data can be input by this configuration.

BRIEF DESCRIPTION OF THE SEVERAL VIEWS OF THE DRAWING

FIG. 5 is a view showing an example of a format of an apparatus management table in the filing apparatus of the present invention;

FIG. 8 is a view showing an example of a format of a user ID in the filing apparatus of the present invention;

FIG. 16 is a view showing an example of a format of an image data management table in the filing apparatus of the present invention.

DETAILED DESCRIPTION OF THE INVENTION

Hereafter, embodiments of the present invention will be described with reference to FIG. 1 to FIG. 17.

First Embodiment

Figure 2:
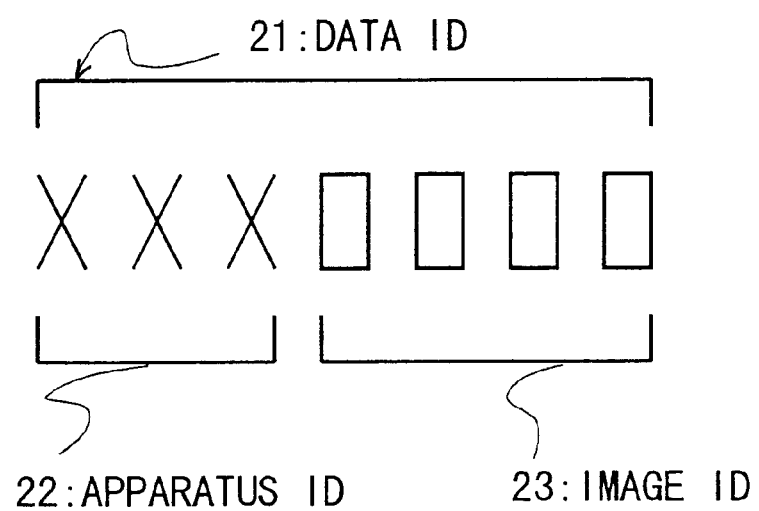
FIG. 2 is a view showing an example of a format of a data ID in the filing apparatus of the present invention.
Figure 3:
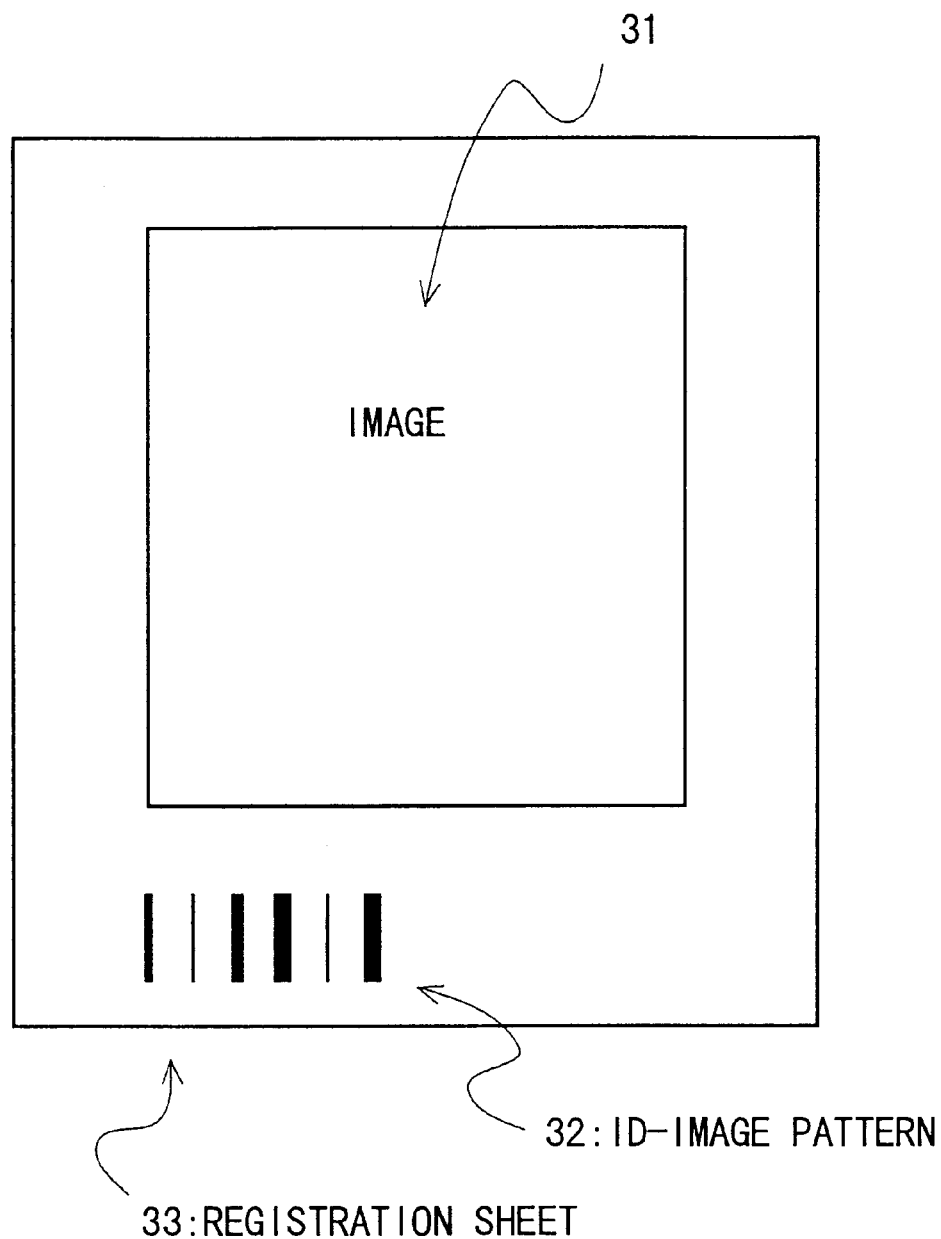
FIG. 3 is a view showing an example of a format of a registration sheet in the filing apparatus of the present invention.

A filing apparatus according to a first embodiment of the present invention will be described with reference to FIG. 1 to FIG. 3.

Figure 1:
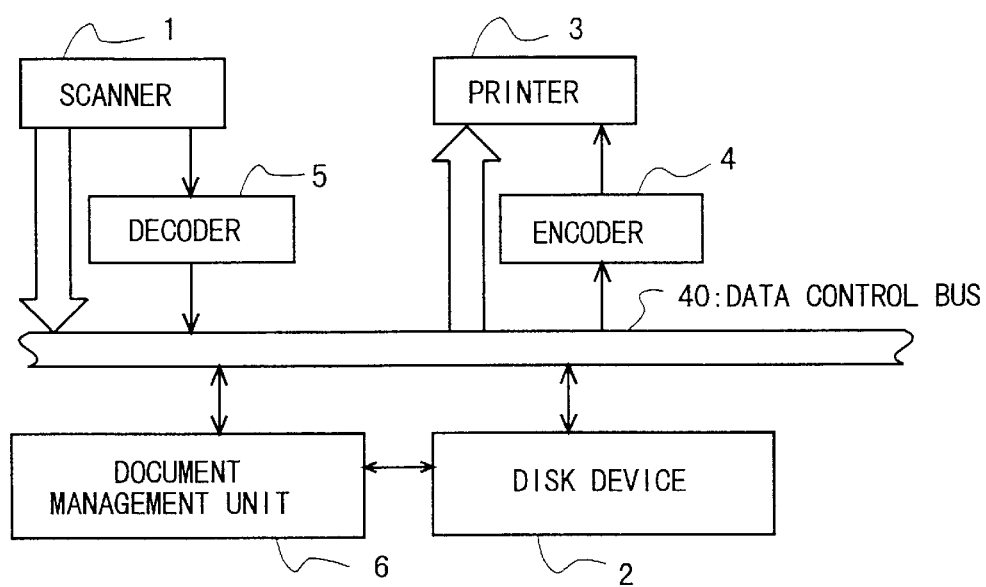
FIG. 1 is a block diagram showing the configuration of a filing apparatus according to a first embodiment of the present invention.

FIG. 1 is a block diagram showing the configuration of the filing apparatus according to the first embodiment.

In FIG. 1, the filing apparatus comprises a scanner 1, a disk device 2, a printer 3, an encoder 4, a decoder 5 and a document management unit 6 which will be described below in detail. An apparatus ID which is a particular identifier for identifying the filing apparatus is assigned to the filing apparatus.

The scanner 1 is connected by its bus output terminal to a data control bus 40 and an output terminal of the scanner 1 is connected to an input terminal of the decoder 5. An output terminal of the decoder 5 is connected to the data control bus 40. The scanner 1 is image reading means for reading an image of a manuscript (hereinafter, referred to as manuscript image) with optical means and outputting image data. The disk device 2 is image storage means for storing the read image data, and is connected to the data control bus 40 and to the document management unit 6. The disk device 2 functions also as an external storage device. The document management unit 6 is connected to the data control bus 40. An input terminal of the encoder 4 is connected to the data control bus 40 and an output terminal thereof is connected to the printer 3. The encoder 4 is for forming an ID-image pattern 32 shown in FIG. 3 by performing a pattern-forming of the below-described data ID 21.

The data ID 21 is an identifier of data. FIG. 2 shows an example of a format of the data ID. The data ID 21 is formed by patterning in accordance with the bar code which can be read by known machines. As shown in FIG. 2, the data ID 21 includes an image ID 23 for identifying a file and an apparatus ID 22 of a filing apparatus storing therein the image data identified by the image ID 23. The decoder 5 is provided for converting the ID-image pattern 32 into the data ID 21. The document management unit 6 is document management means for, in order to handle the image data as a file, generating the image ID 23 and assigning it to the image data, and for managing the image data stored in the disk device 2 based on the image ID 23.

The printer 3 is image output means for outputting onto recording paper the image data stored in the disk device 2 or the image data of a manuscript image read by the scanner 1. The printer 3 also serves as image superimposition means for superimposing the ID-image pattern 32 on the image in order for the user to grasp the contents of the image data stored in the disk device 2. In this embodiment, a registration sheet 33 carrying a bar code is produced through the image superimposition.

The manuscript image is image information which can be detected by the naked eye or an artificial eye such as OCR, and includes everything that is printed on paper, plastic sheets and plastic films, such as letters, numbers, figures, pictures, etc.

An image data registration operation in the filing apparatus shown in FIG. 1 will be described below.

A manuscript image printed, for example, on paper is read by the scanner 1. The image data of the read manuscript image is digitized and stored in the disk device 2. At this time, the document management unit 6 generates the image ID 23 for identifying a file which is necessary for handling the image data as a file. Then, the data ID 21 is produced from the apparatus ID 22 previously assigned to the filing apparatus and the image ID 23. The encoder 4 converts the data ID 21 into the image pattern of the bar code and produces the ID-image pattern 32. The ID-image pattern 32 is superimposed at a predetermined position on the first page of the manuscript of the image data stored in the disk device 2. The superimposed image is recorded onto the registration sheet 33 shown in FIG. 3 by the printer 3.

Although the data ID 21 is converted into the image pattern of the bar code in this embodiment, the data ID 21 may be converted into the image pattern of a specific form of a letter such as an alphanumeric which can be identified by use of the character recognition technology. An image 31 of the registration sheet 33 is not limited to the image on the first page of the manuscript; it may be a reduced image of the image on the first page, the image on the last page of the manuscript or reduced images of the images on plural pages. Moreover, the image 31 may be any kind of image that enables the user to grasp a kind of stored image data by taking a look at the registration sheet 33, such as an image representing the file name, the date when the image data is stored in the disk device 2, the file size, the number of pages or the size of the manuscript, etc.

An image data extraction operation in the filing apparatus shown in FIG. 1 will be described hereafter.

First, the image on the registration sheet 33 is read by the scanner 1. The decoder 5 converts the ID-image pattern 32 of the registration sheet 33 into the data ID 21. The document management unit 6 extracts the apparatus ID 22 from the data ID 21 and it is determined whether or not the apparatus ID 22 coincides with the apparatus ID of the filing apparatus currently used by the user. When they coincide with each other, the document management unit 6 extracts the image ID 23 from the data ID 21. Then, the file is identified based on the extracted image ID 23 and the image data is extracted from the disk device 2. Then, the image of the image data is printed by the printer 3. When both the apparatus IDs do not coincide with each other, the filing apparatus storing the image data therein is identified based on the extracted apparatus ID 22, and the user is informed of the filing apparatus.

As described above, in the filing apparatus according to the first embodiment shown in FIG. 1, the filing apparatus can be identified which stores therein the image data corresponding to the registration sheet 33 on hand of the user.

Second Embodiment

A filing apparatus according to a second embodiment of the present invention will be described with reference to FIG. 4 to FIG. 6.

Figure 4:
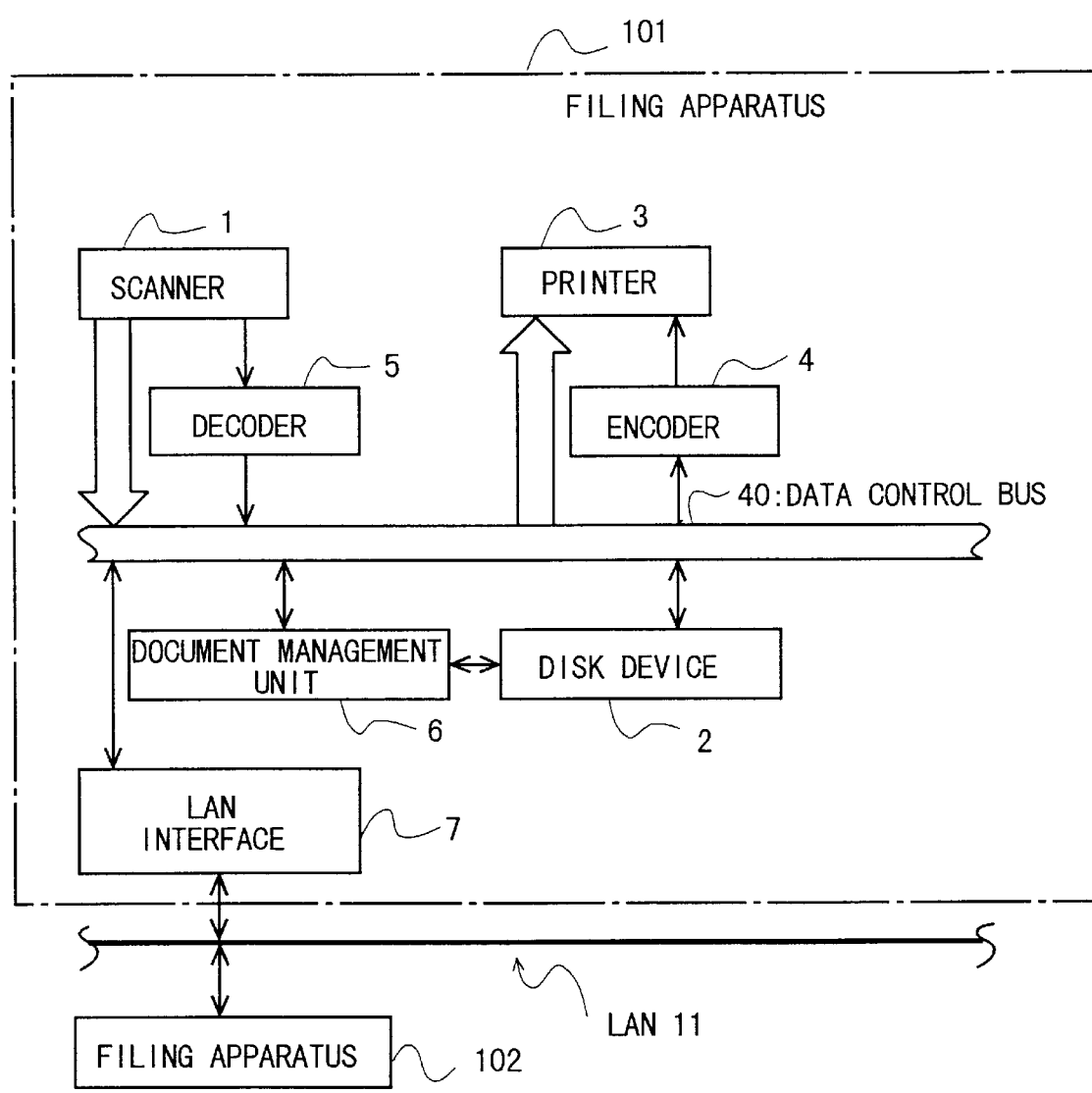
FIG. 4 is a block diagram showing the configuration of a filing apparatus in a filing apparatus according to a second embodiment of the present invention.

FIG. 4 is a block diagram showing the configuration of the filing apparatus according to the second embodiment.

In FIG. 4, the filing apparatus comprises a scanner 1, a disk device 2, a printer 3, an encoder 4, a decoder 5 and a document management unit 6 which are similar to those of the first embodiment. A LAN (local area network) interface 7 connected to a LAN 11 is further provided in the second embodiment. By the LAN interface 7, a plurality of filing apparatuses are connected to the LAN 11. To each filing apparatus, a particular apparatus ID 22 is assigned for identifying the filing apparatus.

The LAN 11 is a communication line for connecting the filing apparatus placed in the vicinity of the user and usable by the user to a filing apparatus located at another place. The LAN interface 7 is communication means for connecting the filing apparatuses to the LAN 11 to perform communication with other filing apparatuses. In the filing apparatus, an apparatus management table 42 shown in FIG. 5 is prepared in order to represent the correspondence between individual apparatus IDs and network addresses. Management information which comprises the apparatus IDs and the network addresses of the filing apparatuses connected to the LAN 11 is previously registered in the apparatus management table 42. The network address may take various forms according to the protocol of the network in use. With respect to the elements similar to those of the first embodiment, no overlapping description will be given because the description of the first embodiment of FIG. 1 is applicable.

An image data registration operation in the filing apparatus according to the second embodiment will not be described because it is similar to that of the first embodiment.

An image data extraction operation in the filing apparatus of FIG. 4 will be described with reference to the flowchart of FIG. 6. For convenience of description, two filing apparatuses connected through the LAN 11 are denoted by reference numerals 101 and 102, respectively. The filing apparatus 101 and the filing apparatus 102 have the same configuration.

Figure 6:
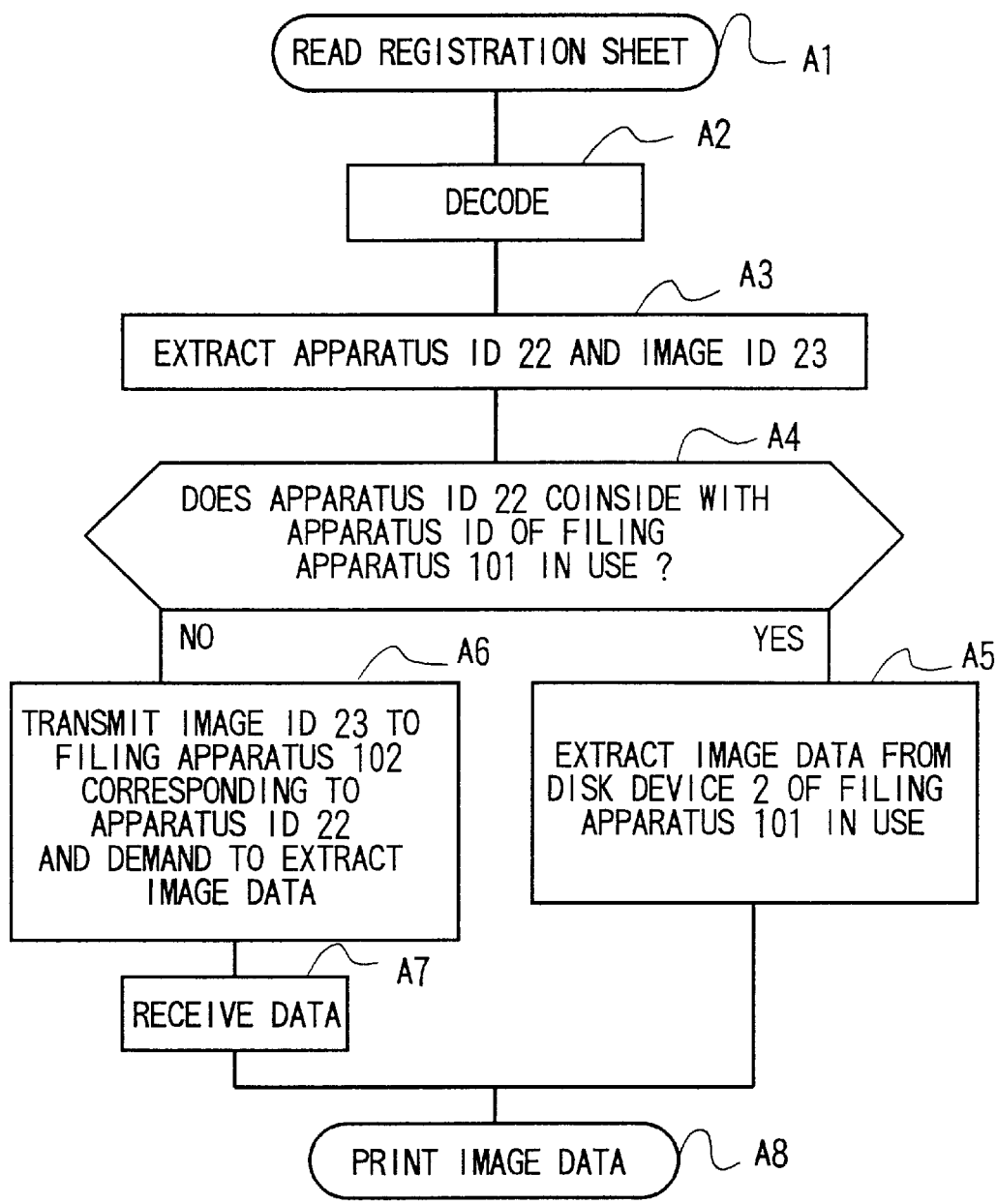
FIG. 6 is a flowchart showing an image data extraction operation in the filing apparatus according to the second embodiment.

First, the registration sheet 33 is read by the scanner 1 (step A1 of the flowchart of FIG. 6). The decoder 5 decodes the ID-image pattern 32 of the registration sheet 33 and converts it into the data ID 21 (step A2). The document management unit 6 extracts the apparatus ID 22 and the image ID 23 from the data ID 21 (step A3). It is determined whether or not the apparatus ID 22 coincides with the apparatus ID of the filing apparatus 101 used by the user (step A4). When they coincide with each other, the file is identified based on the extracted image ID 23, and the image data is extracted from the disk device 2 (step A5). When the apparatus IDs do not coincide with each other, the network address corresponding to the extracted apparatus ID 22 is retrieved with reference to the apparatus management table 42.

When the filing apparatus 102 corresponding to the apparatus ID 22 is detected, the filing apparatus 101 performs communication with the filing apparatus 102, and transmits the image ID 23 and demands extraction of the image data corresponding to the image ID 23 (step A6). In the filing apparatus 102 having received the demand, the file is identified based on the received image ID 23, and the image data is extracted from the disk device 2. Then, the image data is transmitted to the filing apparatus 101 of the demander. The filing apparatus 101 of the demander receives the image data (step A7). The image from the image data is printed by the printer 3 of the filing apparatus 101 (step A8).

As described above, in the filing apparatus according to the second embodiment shown in FIG. 4, even when it is uncertain which filing apparatus stores the image data corresponding to the user's registration sheet 33, or even when the filing apparatus storing the image data corresponding to the registration sheet 33 is located away from the user's filing apparatus, the image data corresponding to the registration sheet 33 may be easily extracted from the user's filing apparatus. When the filing apparatus in the vicinity of the user cannot be used by the user because it is used by another user, by transmitting the desired image data to a filing apparatus in another place, the desired image can be extracted from the filing apparatus.

Though FIG. 4 shows an example in which a plurality of filing apparatuses are connected through the LAN 11. Similar effects can be obtained by using data modems and previously registering telephone numbers even when the public line is used. Moreover, similar effects are obtained, even when a communication scheme is used in which one-to-one connection is made such as a well-known protocol of RS232 of the serial communication method, or when an exclusive line is used such as section party telephone within a station yard.

Third Embodiment

A filing apparatus according to a third embodiment of the present invention will be described with reference to FIG. 7 to FIG. 10.

Figure 7:
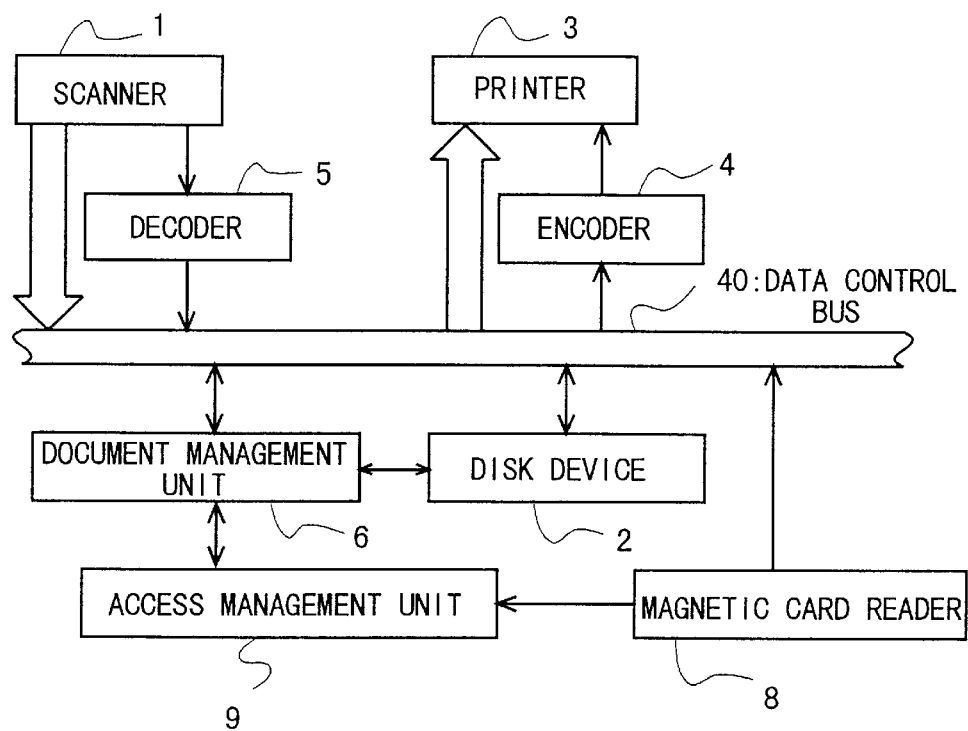
FIG. 7 is a block diagram showing the configuration of a filing apparatus according to a third embodiment of the present invention.

FIG. 7 is a block diagram showing the configuration of the filing apparatus according to the third embodiment.

In FIG. 7, the filing apparatus comprises a scanner 1, a disk device 2, a printer 3, an encoder 4, a decoder 5 and a document management unit 6 which are similar to those of the first embodiment. In the third embodiment, a magnetic card reader 8 and an access management unit 9 are further provided. To the filing apparatus, a particular apparatus ID 22 is assigned for identifying the filing apparatus. The user has a magnetic card serving as user identifying means. The magnetic card includes a user ID 24 which is an identifier for identifying the user as shown in FIG. 8.

The magnetic card reader 8 extracts the user ID 24 from the magnetic card. The user ID 24 includes, as shown in FIG. 8, at least an apparatus ID 25 representative of the filing apparatus in which the user is registered and user information 26 particular to the user. Though the apparatus ID 22 included in the data ID 21 shown in FIG. 2 and the apparatus ID 25 included in the user ID 24 represent the same identifier, they are denoted by different reference numerals for convenience of description. The access management unit 9 is access management means and limits the range of access to the disk device 2 based on the user information 26 output from the magnetic card reader 8. With respect to the elements similar to those of the first embodiment, no overlapping description will be given because the description of the first embodiment of FIG. 1 is applicable.

An image data registration operation in the filing apparatus shown in FIG. 7 will be described with reference to the flowchart of FIG. 9.

Figure 9:
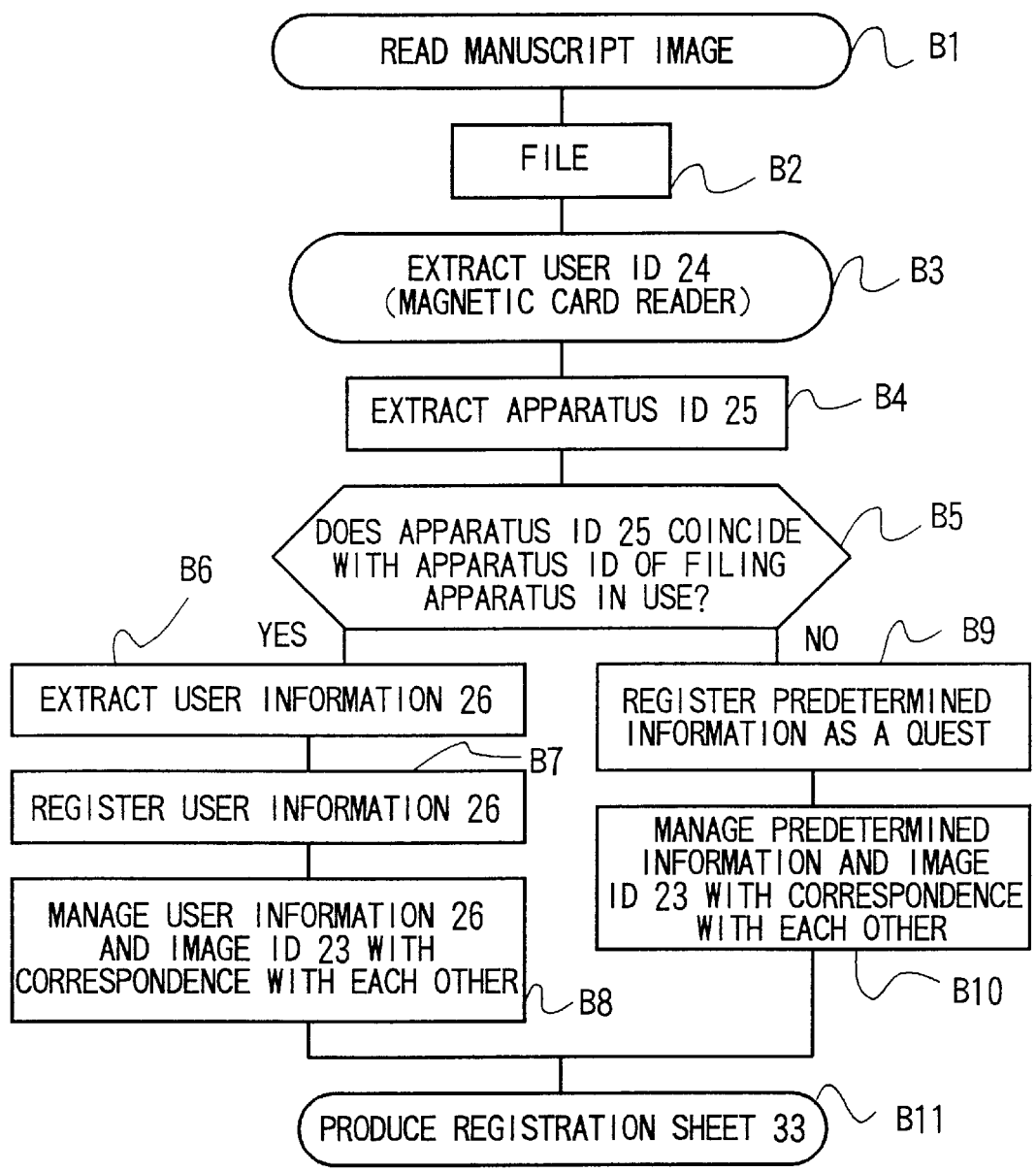
FIG. 9 is a flowchart showing an image data registration operation in the filing apparatus according to the third embodiment.

A manuscript image printed, for example, on paper is read by the scanner 1 (step B1 of the flowchart of FIG. 9). The image data of the read manuscript image is digitized and stored in the disk device 2. At this time, the image ID 23 which is an identifier for identifying the file necessary for handling the image data as a file is generated by the document management unit 6 (step B2). The magnetic card reader 8 extracts the user ID 24 from the magnetic card (step B3).

The access management unit 9 extracts the apparatus ID 25 from the user ID 24 (step B4) and it is determined whether or not the extracted apparatus ID 25 coincides with the apparatus ID of a filing apparatus which is used by the user (step B5). When they coincide with each other, the access management unit 9 extracts the user information 26 from the extracted user ID 24 (step B6). The extracted user information 26 is registered in the access management unit 9 (step B7).

The access management unit 9 manages the user information 26 and the image ID 23 so as to correspond with each other (step B8). When the apparatus ID 25 does not coincide with the apparatus ID of the filing apparatus which is used by the user, the user ID 24 is handled as a guest and "predetermined information" is registered in the access management unit 9 (step B9). The "predetermined information" represents that the image data is of a user which is not registered in the filing apparatus. This predetermined information enables all the users to access the image data. The access management unit 9 manages the predetermined information and the image ID 23 so as to correspond with each other (step B10). Then, the document management unit 6 generates the data ID 21 from the generated image ID 23 and the apparatus ID 22 preset in the filing apparatus which is used by the user. The registration sheet 33 is produced by the procedure described in the first embodiment based on the data ID 21 (step B11). The user information 26 or the predetermined information can be registered in the document management unit 6 instead of the access management unit 9 so that the information is managed by the document management unit 6.

Figure 10:
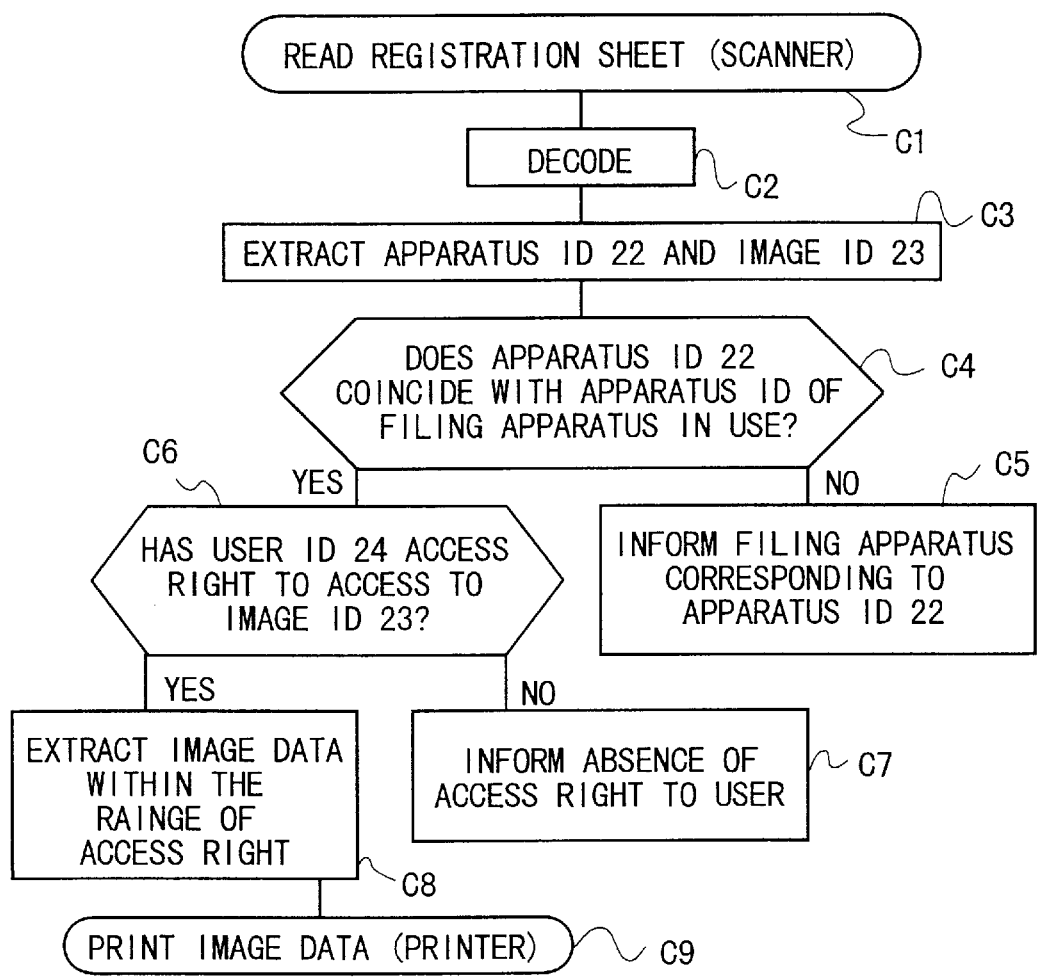
FIG. 10 is a flowchart showing an image data extraction operation in the filing apparatus according to the third embodiment.

Next, an image data extraction operation in the filing apparatus of FIG. 7 will be described with reference to FIG. 7 and the flowchart of FIG. 10.

The user ID 24 shown in FIG. 8 is previously read from the magnetic card by the magnetic card reader 8. On the other hand, the ID-image pattern 32 on the registration sheet 33 is read by the scanner 1 (step C1 of the flowchart of FIG. 10). The decoder 5 decodes the ID-image pattern 32 on the registration sheet 33 and converts it into the data ID 21 (step C2). The document management unit 6 extracts the apparatus ID 22 and the image ID 23 from the data ID 21 (step C3).

It is determined whether or not the extracted apparatus ID 22 coincides with the apparatus ID of the filing apparatus used by the user (step C4). When they do not coincide with each other, the filing apparatus storing the image data therein is detected based on the extracted apparatus ID 22, and the user is informed of the detected apparatus (step C5). When the apparatus ID coincides with the apparatus ID of the filing apparatus used by the user, the access management unit 9 determines whether the user ID 24 has the right to access the data corresponding to the image ID 23 or not (step C6). The presence or absence of the access right is previously stored in the access management unit 9 for each user ID 24. When the user ID 24 does not have the access right, the user is informed of the absence of the access right (step C7). When the user ID 24 has the access right, the file is identified based on the image ID 23 and the image data is extracted from the disk device 2 (step C8). Then, the image of the image data is printed by the printer 3 (step C9).

As described above, in the filing apparatus shown in FIG. 7, it may be identified which filing apparatus stores therein the image data corresponding to the registration sheet 33 possessed by the user. In addition, since the access to the image data stored in the filing apparatus is limited according to the presence or absence of the right represented by the user information 26 stored in the magnetic card, the confidentiality of the registered information is secured.

Fourth Embodiment

A filing apparatus according to a fourth embodiment of the present invention will be described with reference to FIG. 11 and FIG. 12.

Figure 11:
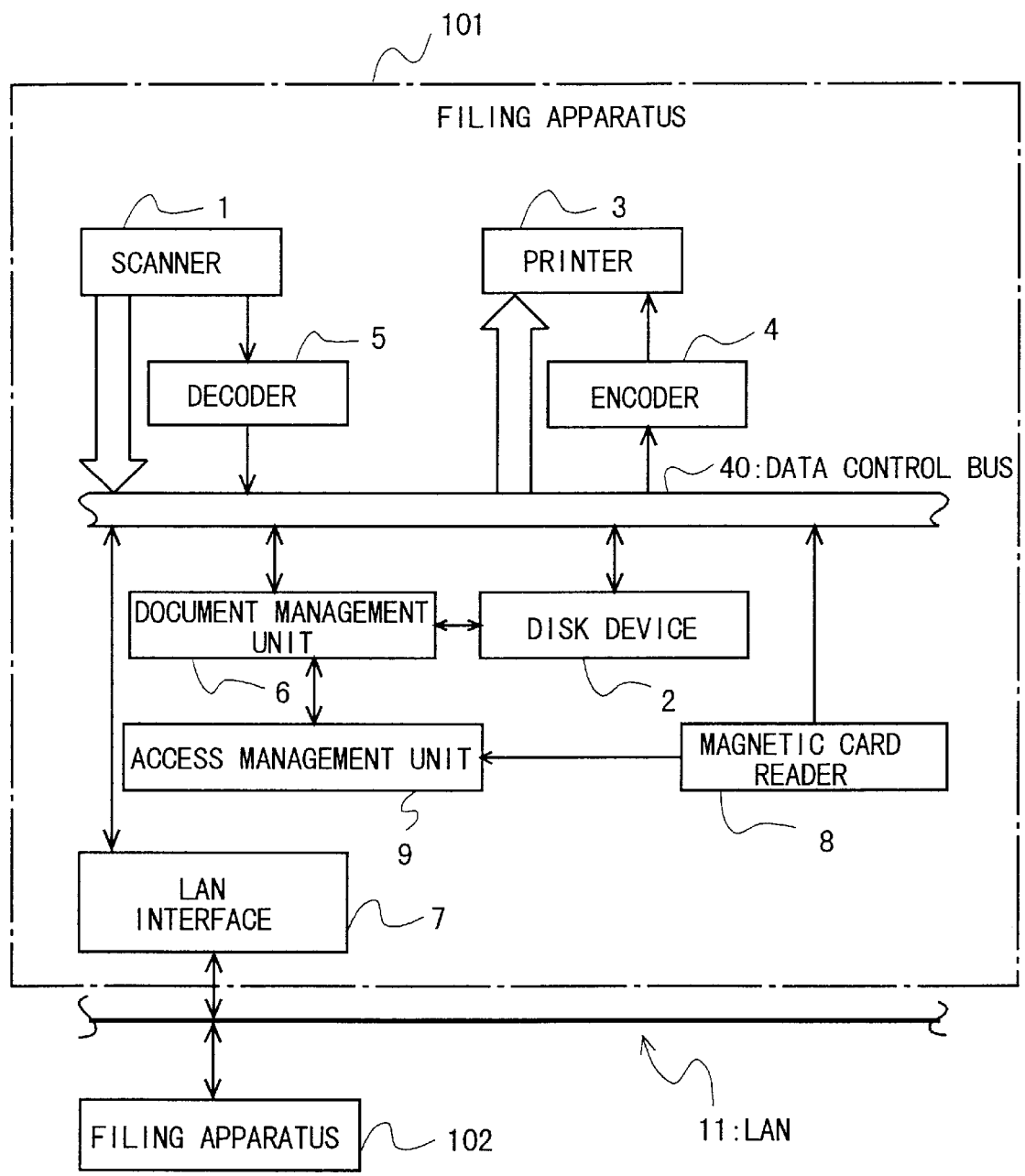
FIG. 11 is a block diagram showing the configuration of a filing apparatus according to a fourth embodiment of the present invention.
Figure 12:
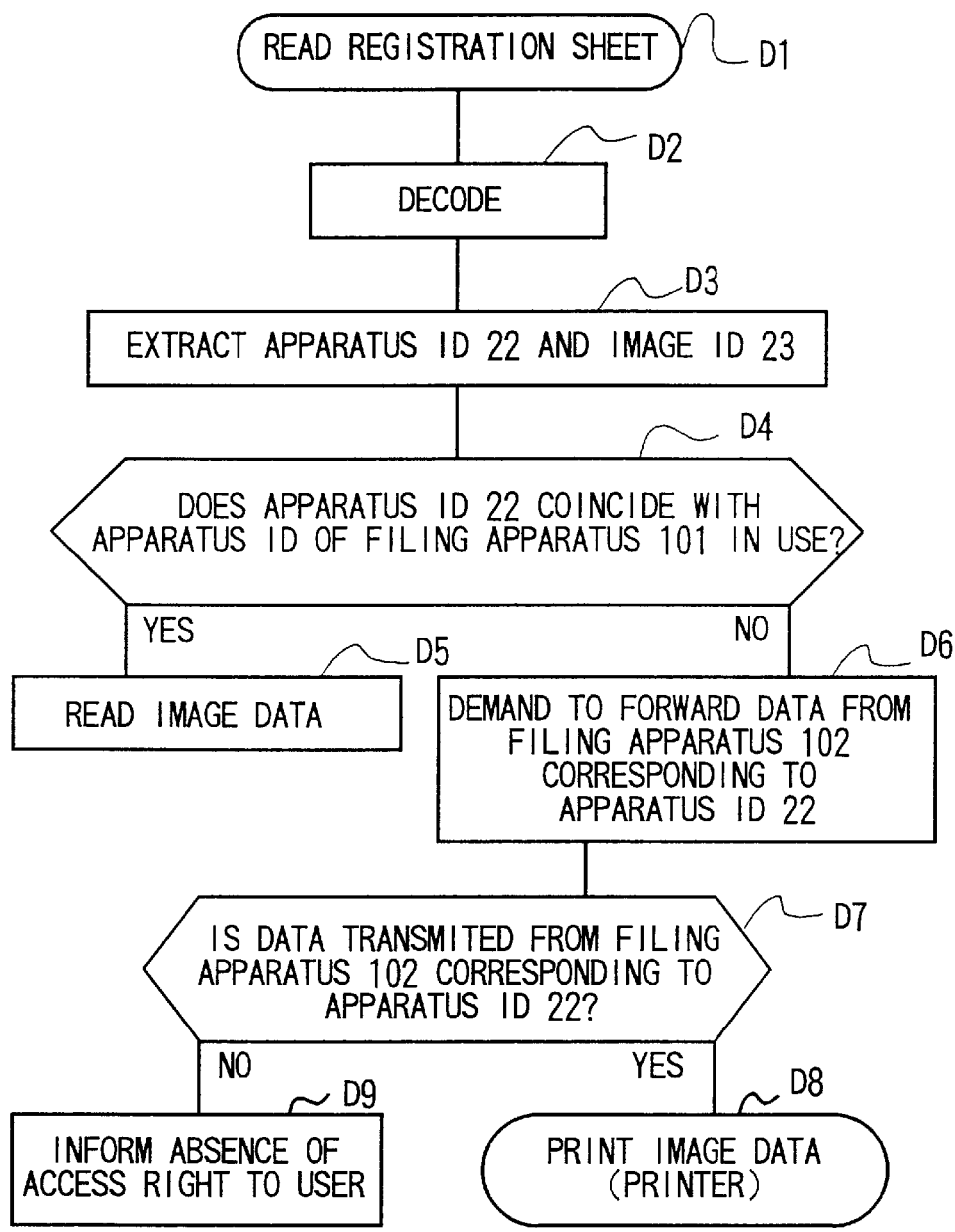
FIG. 12 is a flowchart showing an image data extraction operation in the filing apparatus according to the fourth embodiment.

FIG. 11 is a block diagram showing the configuration of the filing apparatus according to the fourth embodiment.

In FIG. 11, the filing apparatus comprises a scanner 1, a disk device 2, a printer 3, an encoder 4, a decoder 5, a document management unit 6, a magnetic card reader 8 and an access management unit 9 which are similar to those of the third embodiment. In the fourth embodiment, a LAN interface 7 and a LAN 11 are further provided. To a filing apparatus, a particular apparatus ID is assigned for identifying the filing apparatus. The apparatus management table 42 shown in FIG. 5 and described in the second embodiment is also prepared. No overlapping description will be given with respect to the elements similar to those of the third embodiment, because the descriptions of the first embodiment shown FIG. 1, the second embodiment shown in FIG. 4 and the third embodiment shown in FIG. 7 are applicable.

An image data extraction operation in the filing apparatus of FIG. 11 will be described with reference to the flowchart of FIG. 12. For convenience of description, two filing apparatuses connected through the LAN 11 are denoted by reference numerals 101 and 102, respectively. The filing apparatus 101 and the filing apparatus 102 have the same configuration.

In the filing apparatus 101 currently used by the user, the user ID 24 shown in FIG. 8 is previously read from the magnetic card by the magnetic card reader 8. On the other hand, the ID-image pattern 32 on the registration sheet 33 is read by the scanner 1 (step D1 of the flowchart of FIG. 12). The decoder 5 decodes the ID-image pattern 32 on the registration sheet 33 and converts it into the data ID 21 (step D2). The document management unit 6 extracts the apparatus ID 22 and the image ID 23 from the data ID 21 (step D3). It is determined whether or not the apparatus ID 22 coincides with the apparatus ID of the filing apparatus 101 currently used by the user (step D4). When they coincide with each other, the image data is read by a procedure similar to that of the third embodiment (step D5). When the apparatus IDs do not coincide with each other, a network address which corresponds to the extracted apparatus ID 22 is retrieved with reference to the apparatus management table 42 shown in FIG. 5.

When the filing apparatus 102 corresponding to the apparatus ID 22 is detected, the filing apparatus 101 performs communication with the filing apparatus 102. In the communication, the filing apparatus 101 transmits the image ID 23 and the user ID 24 to the filing apparatus 102 and demands extraction of the image data corresponding to the image ID 23 from the filing apparatus 102 (step D6). In the filing apparatus 102 having received the demand, it is determined whether or not the received user ID 24 has the right to access the image ID 23 by a method similar to that of the third embodiment. When the user ID 24 has the access right, the image data corresponding to the image ID 23 is transmitted from the filing apparatus 102 to the filing apparatus 101 of demander. When the user ID 24 does not have the access right, the filing apparatus 101 which sent the demand is informed of the absence of the access right. When the user has the access right, according to the response from the filing apparatus 102 corresponding to the apparatus ID 22 (step D7), the image of the image data is printed by the printer 3 in the filing apparatus 101 (step D8). When the user does not have the access right, the user is informed of the absence of the access right through the filing apparatus 101 (step D9).

In this embodiment, the user ID 24 and the image ID 23 are simultaneously transmitted to the filing apparatus 102 storing the image data therein. As another method, only the image ID 23 may be transmitted to the filing apparatus 102. In this case, information on a user permitted to access the file corresponding to the image ID 23 is obtained from the filing apparatus 102 in which the image data is recorded, and the presence or absence of the access right of the user can be checked on the side of the filing apparatus 101.

As described above, in the filing apparatus according to the fourth embodiment shown in FIG. 11, the user having the right to access the image data can extract the image data corresponding to the registration sheet 33 of the user, even when it is uncertain which filing apparatus stores therein the image data corresponding to the registration sheet 33. Furthermore, when the filing apparatus storing therein the image data corresponding to the registration sheet 33 of the user is located away from the user, the user having the right of access can extract the image data from a filing apparatus located in the vicinity of the user. When the filing apparatus in the vicinity of the user cannot be used by the user because it is used by another user, by transmitting the desired image data to a filing apparatus in another place, the desired image can be extracted from the filing apparatus.

In addition, by managing the user's right to access the image data, the image data is prevented from being easily extracted by users other than the users having the access right, so that the confidentiality is secured.

Fifth Embodiment

A filing apparatus according to a fifth embodiment of the present invention will be described with reference to FIG. 13 and FIG. 14.

Figure 13:
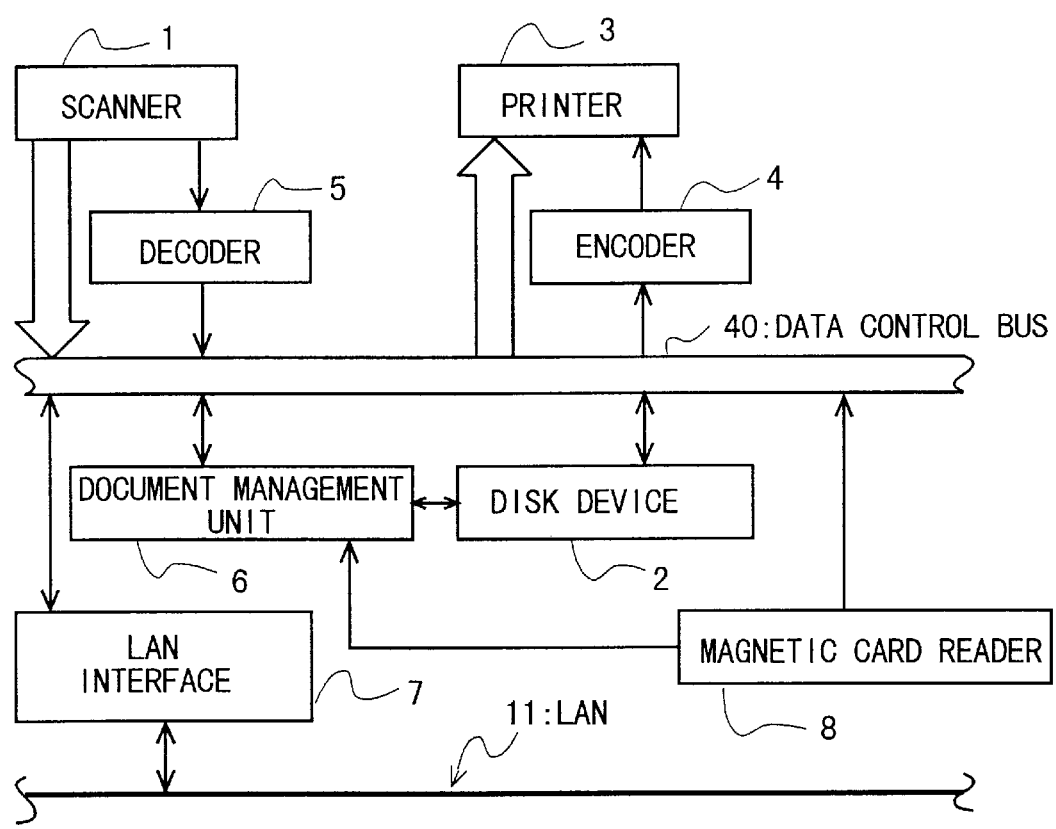
FIG. 13 is a block diagram showing the configuration of a filing apparatus according to a fifth embodiment of the present invention.

FIG. 13 is a block diagram showing the configuration of the filing apparatus according to the fifth embodiment.

In FIG. 13, the filing apparatus comprises a scanner 1, a disk device 2, a printer 3, an encoder 4, a decoder 5, a document management unit 6, a LAN interface 7, a magnetic card reader 8 and a LAN 11 which are similar to those of the fourth embodiment. A plurality of filing apparatuses are connected to one another by the LAN 11. A particular apparatus ID is assigned to each filing apparatus for identifying the filing apparatus.

The magnetic card reader 8 is user identification means for reading and identifying the filing apparatus in which the user is registered based on the apparatus ID possessed by the user. The apparatus management table shown in FIG. 5 described with reference to the second embodiment is prepared in the filing apparatus. With respect to the other elements, no overlapping description will be given because the description of the first embodiment shown FIG. 1 and the description of the second embodiment shown in FIG. 4 are applicable.

An image data registration operation in the filing apparatus of FIG. 13 will be described with reference to the flowchart of FIG. 14. For convenience of description, two filing apparatuses are denoted by reference numerals 101 and 102, respectively. The filing apparatus 101 and the filing apparatus 102 have the same configuration.

The magnetic card reader 8 extracts from the magnetic card the apparatus ID of the filing apparatus in which the user is registered (step E1). It is determined whether or not the extracted apparatus ID coincides with the apparatus ID of the filing apparatus 101 currently used by the user (step E2). When the apparatus IDs coincide with each other, the image data of the manuscript image printed on paper is stored in the disk device 2 and the registration sheet 33 is produced in compliance with the procedure described with reference to the first embodiment (step E3). When the apparatus IDs do not coincide with each other, the network address which corresponds to the extracted apparatus ID is retrieved with reference to the apparatus management table shown in FIG. 5 (step E4).

Then, the filing apparatus 101 performs communication with the filing apparatus 102 corresponding to the extracted apparatus ID and transmits a demand for generation of the image ID 23 to the filing apparatus 102 (step E5). When the filing apparatus 102 generates the image ID 23, the scanner 1 of the filing apparatus 101 currently used by the user reads the manuscript image printed on paper (step E6). The image data of the read manuscript image is transmitted to the filing apparatus 102 corresponding to the extracted apparatus ID (step E7). In the filing apparatus 102, the received image data is stored in the disk device 2 and the image ID 23 is linked to the stored image data. The document management unit 6 of the filing apparatus 101 currently used by the user generates the data ID 21 from the apparatus ID stored in the magnetic card and the image ID 23. Lastly, following the procedure described with reference to the first embodiment, normal registration is made and the registration sheet 33 is produced (step E8).

Figure 14:
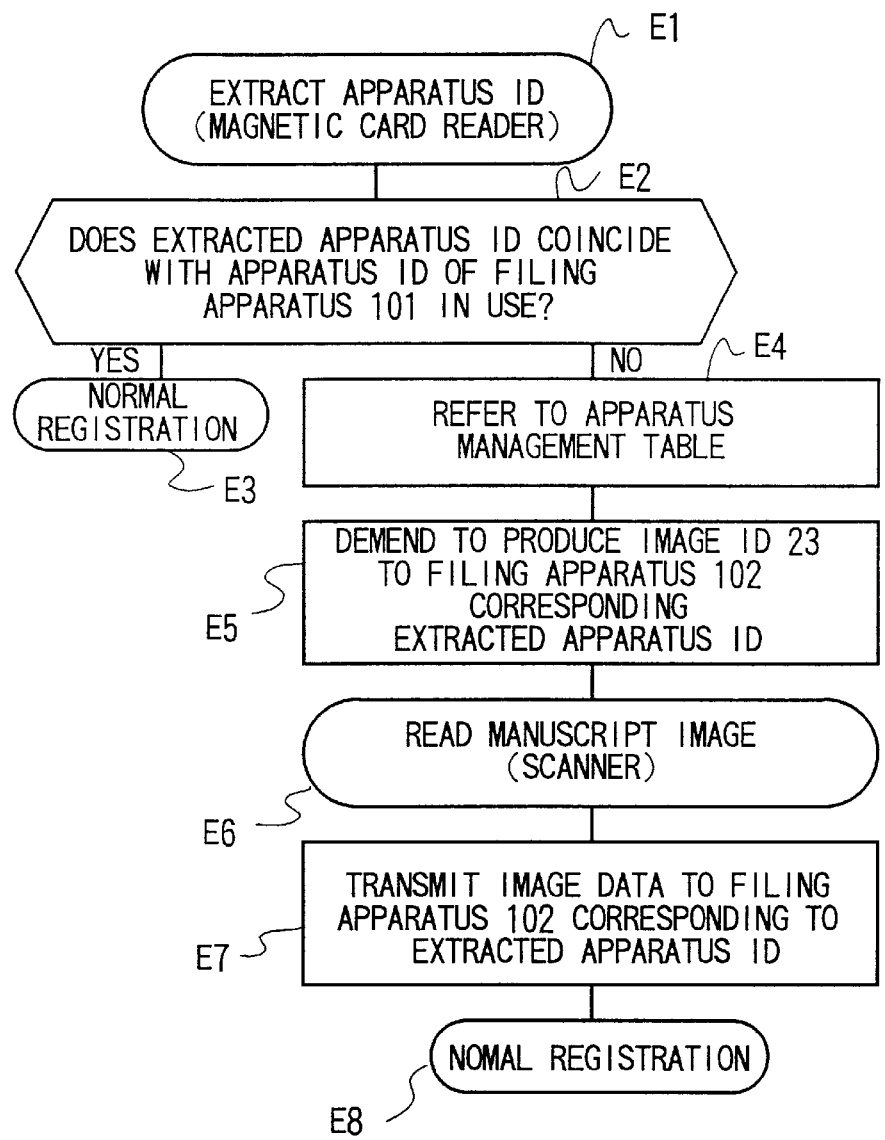
FIG. 14 is a flowchart showing an image data registration operation in the filing apparatus according to the fifth embodiment.

In the case of the operation shown in the flowchart of FIG. 14, first, the image ID 23 is generated by the filing apparatus 102 corresponding to the apparatus ID extracted by the magnetic card reader 8 and then, the manuscript image is read. In another method, the manuscript image may be read first. In this case, the image data of the manuscript image is stored in the disk device of the temporarily used filing apparatus 101 and then, the generation of the image ID 23 may be demanded of the filing apparatus 102 corresponding to the apparatus ID extracted by the magnetic card reader 8.

As described above, in the filing apparatus shown in FIG. 13, the user can store the image data in the filing apparatus in which the user is registered even from a filing apparatus in which the user is not registered.

The magnetic card reader 8 which is used as user identification means in the third, fourth and fifth embodiments can be replaced with a method in which a password or a secret number is input by use of a touch screen or a keyboard, etc. Similar effects as those of the above-described embodiments are obtained when user identification means using IC cards or punch cards are employed.

Sixth Embodiment

Figure 17:
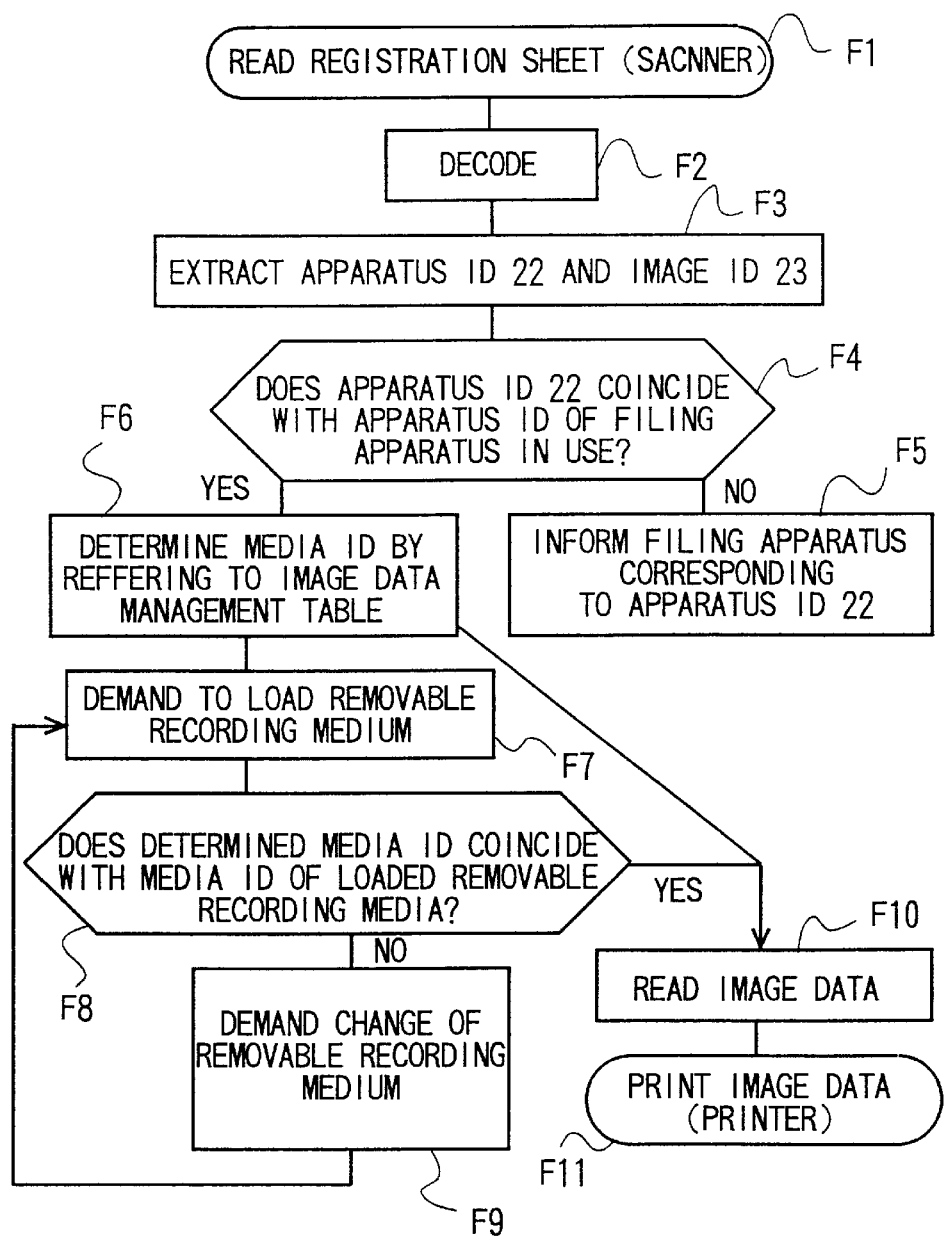
FIG. 17 is a flowchart showing an image data extraction operation in the filing apparatus according to the sixth embodiment.

A filing apparatus according to a sixth embodiment of the present invention will be described with reference to FIG. 15 to FIG. 17.

Figure 15:
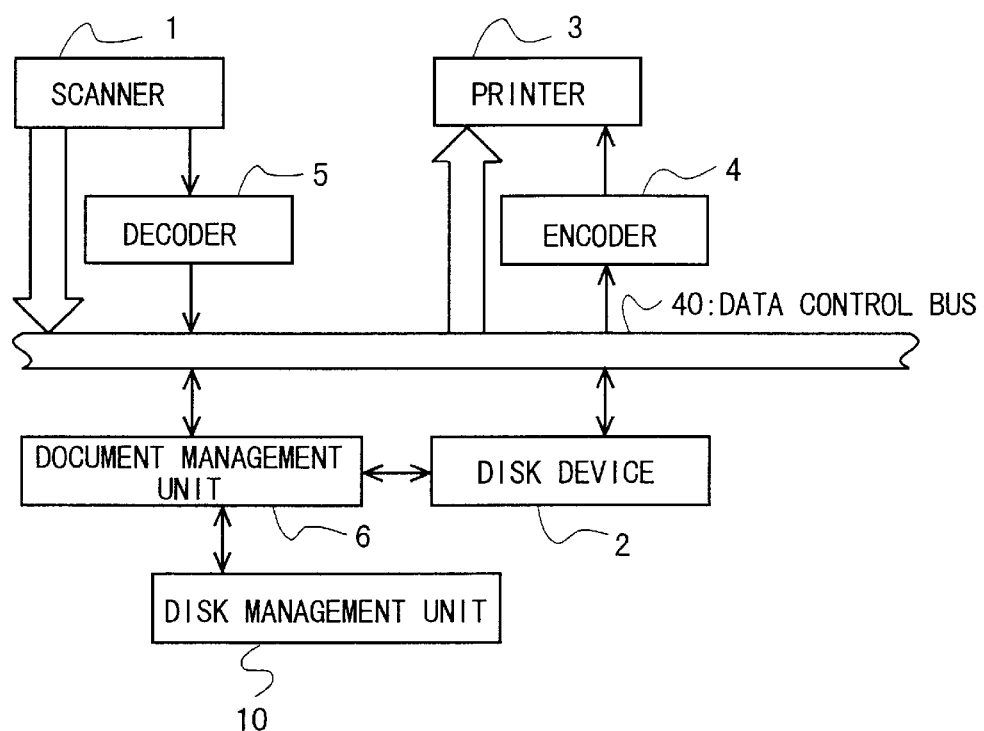
FIG. 15 is a block diagram showing the configuration of a filing apparatus according to a sixth embodiment of the present invention.

FIG. 15 is a block diagram showing the configuration of the filing apparatus according to the sixth embodiment.

In FIG. 15, the filing apparatus comprises a scanner 1, a disk device 2, a printer 3, an encoder 4, a decoder 5 and a document management unit 6 which are similar to those of the first embodiment. A disk management unit 10 is connected to the document management unit 6. A particular apparatus ID 22 is assigned to a filing apparatus for identifying the filing apparatus.

The disk device 2 includes a fixed disk device and a storage device using a removable recording medium such as an optical disk and a magneto-optical disk. A particular media ID which is an identifier for identifying the removable recording medium is stored in the removable recording medium. The disk management unit 10 is image management means and manages the storage device storing the image data therein by use of an image data management table shown in FIG. 16. In the image data management table, the image data is registered with linkage to the user ID 24, the media ID, the image ID 23 and the file size, etc. When the image data is stored in the fixed disk device in the disk device 2, an ID which is an identifier representative of the fixed disk device is used as the media ID. With respect to the other elements, no overlapping description will be given because the description of the first embodiment of FIG. 1 is applicable.

The image data stored in the fixed disk device in the disk device 2 can be transferred to the removable recording medium. In this case, the disk management unit 10 rewrites the media ID in the image data management table to the media ID of the removable recording medium to which the image data has been transferred so that the image data is managed.

An image data extraction operation in the filing apparatus according to the sixth embodiment of FIG. 15 will be described with reference to the flowchart of FIG. 17.

The data on the registration sheet 33 is read by the scanner 1 (step F1). The decoder 5 converts the ID-image pattern 32 on the registration sheet 33 into the data ID 21 (step F2). The document management unit 6 extracts the apparatus ID 22 and the image ID 23 from the data ID 21 (step F3). It is determined whether or not the extracted apparatus ID 22 coincides with the apparatus ID of the filing apparatus used by the user (step F4). When they do not coincide with each other, the user is informed of the filing apparatus storing the image data therein based on the extracted apparatus ID 22 (step F5). When the apparatus IDs coincide with each other, the disk management unit 10 determines a media ID corresponding to the extracted image ID 23 by referring to the image data management table (step F6). When the determined media ID represents the fixed disk device, the file is identified based on the image ID 23, and the image data is extracted from the fixed disk device (step F10). When a determined media ID is the media ID of the removable recording medium, it is demanded that the removable recording medium be loaded in the disk device 2 (F7).

It is determined whether or not the media ID identified by the disk management unit 10 coincides with the media ID of the removable recording medium loaded in the disk device 2 (step F8). When they do not coincide with each other, it is demanded that other removable recording medium be loaded in the disk device 2 (step F9). This operation is repeated until the identified media ID coincides with the media ID of the removable recording medium loaded in the disk device. When they coincide with each other, the file is identified based on the image ID 23, and the image data is extracted from the removable recording medium (step F10). Then, the image of the image data is printed by the printer 3 (step F11).

As described above, in the filing apparatus according to the sixth embodiment shown in FIG. 15, even the image data having been moved from the fixed disk device in the disk device 2 to the removable recording medium can be easily extracted by use of the registration sheet 33. In addition, as many files as the data size of the image data management table allows can be handled without any limitation by the capacity of the fixed disk device.

Furthermore, the access to the image data may be controlled for each user by adding a user identification unit. In addition, if the user has on hand the registration sheet 33 and a removable recording medium in connection with the registration sheet 33, even image data managed by other filing apparatus can be easily extracted by using a communication function such as a network.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A filing apparatus comprising:
   image reading means for reading an image of a manuscript with optical means and outputting image data;
   image storage means for storing said image data read by said image reading means in an external storage device;
   an encoder for generating an ID-image pattern by putting a data ID into an image pattern, said data ID comprising:
   (1) an identifier of data including an image ID as an identifier assigned to said image data; and
   (2) a predetermined apparatus ID as an identifier assigned to each of a plurality of filing apparatuses, wherein each of the plurality of filing apparatuses has a different predetermined apparatus ID;

image superimposition means for superimposing said ID-image pattern on image information representative of a characteristic of said image;

a decoder for performing conversion for obtaining an original data ID from said ID-image pattern in the superimposed image formed by said image superimposition means;

document management means for managing a document stored in said image storage means so as to link said image data with said data ID; and image output means for outputting image data of the document corresponding to said data ID stored in said image storage means by identifying the document by said document management means based on said data ID.

2. A filing apparatus in accordance with claim 1, further comprising:

management information storage means for storing therein management information for connection between a predetermined filing apparatus and at least one other filing apparatus; and communication means for performing communication between said predetermined filing apparatus and said other filing apparatus, whereby when the apparatus ID of said predetermined filing apparatus does not coincide with an apparatus ID included in a data ID, said other filing apparatus corresponding to said apparatus ID included in said data ID is identified from said apparatus ID included in said data ID and said management information, and communication is performed, and image data corresponding to an image ID included in said data ID is extracted from said other filing apparatus, is transmitted to said predetermined filing apparatus and is output from said image output means of said predetermined filing apparatus.

3. A firing apparatus comprising:

image reading means for reading an image of a manuscript with optical means and outputting image data;

image storage means for storing said image data read by said image reading means in an external storage device;

an encoder for generating an ID-image pattern by putting a data ID into an image pattern, said data ID comprising:

(1) an identifier of data including an image ID as an identifier assigned to said image data; and (2) a predetermined apparatus ID as an identifier assigned to each of a plurality of filing apparatuses, wherein each of the plurality of filing apparatuses has a different predetermined apparatus ID;

image superimposition means for superimposing said ID-image pattern on image information representative of a characteristic of said image;

a decoder for performing conversion for obtaining an original data ID from said ID-image pattern in the superimposed image formed by said image superimposition means;

document management means for managing a document stored in said image storage means so as to link said image data with said data ID;

image output means for outputting image data of the document corresponding to said data ID stored in said image storage means by identifying the document by said document management means based on said data ID;

user identification means for identifying a user based on a user ID comprising particular user information of each user and an apparatus ID of a filing apparatus in which the user is registered; and access management means for limiting access to said image data stored in said image storage means based on said user information included in said user ID.

4. A filing apparatus in accordance with claim 3, further comprising:

management information storage means for storing therein management information for connection between a predetermined filing apparatus and at least one other filing apparatus; and communication means for performing communication between said predetermined filing apparatus and said other filing apparatus;

whereby when the apparatus ID of said predetermined filing apparatus does not coincide with an apparatus ID included in a data ID, said other filing apparatus corresponding to said apparatus ID included in said data ID is identified from said apparatus ID included in said data ID and said management information, and communication is performed, image data corresponding to an image ID included in said data ID is extracted from said other filing apparatus, is transmitted to said predetermined filing apparatus and is output from said image output means of said predetermined filing apparatus.

5. A filing apparatus comprising:

image reading means for reading an image of a manuscript with optical means and outputting image data;

image storage means for storing said image data read by said image reading means in an external storage device;

an encoder for generating an ID-image pattern by putting a data ID into an image pattern, said data ID comprising:

(1) an identifier of data including an image ID as an identifier assigned to said image data; and (2) a predetermined apparatus ID as an identifier assigned to each of a plurality of filing apparatuses, wherein each of the plurality of filing apparatuses has a different predetermined apparatus ID;

image superimposition means for superimposing said ID-image pattern on image information representative of a characteristic of said image;

a decoder for performing conversion for obtaining an original data ID from said ID-image pattern in the superimposed image formed by said image superimposition means;

document management means for managing said image data stored in said image storage means as a document so as to link said image data with said data ID;

image output means for outputting image data of the document corresponding to said data ID stored in said image storage means by identifying the document by said document management means based on said data ID;

user identification means for identifying a user based on a user ID comprising particular user information determined for each user and the apparatus ID of a filing apparatus in which the user is registered;

management information storage means for storing therein management information for connection between a predetermined filing apparatus and at least one other filing apparatus; and communication means for performing communication between said predetermined filing apparatus and said other filing apparatus;

whereby when said apparatus ID included in said user ID is different from an apparatus ID of said predetermined filing apparatus, communication with said other filing apparatus having an apparatus ID included in said user ID is performed based on management information in connection with said other filing apparatus, and image data read from said image reading means of said predetermined filing apparatus is stored in said image storage means of said other filing apparatus.

6. A filing apparatus in accordance with claim 1, 3 or 5, wherein said image storage means comprises:

a storage device using a fixed disk device and a removable recording medium; and disk management means for managing said removable recording medium storing said image data therein so that said image ID of said image data corresponds to a media ID, and said media ID being assigned for identifying a type of said storage device and said removable recording medium.

7. A filing apparatus in accordance with claim 3, 4 or 5, wherein said user identification means comprises an input device selected from among a magnetic card reader, a keyboard and a touch screen.

8. An electronic image filing apparatus, comprising:

a document management unit;

digital data corresponding to an image, wherein said data is provided to said document management unit;

a data identification generator operatively connected to said document management unit, wherein said data identification generator assigns a data identification to said digital data, wherein said data identification comprises an image identification corresponding to said digital data and a predetermined apparatus identification corresponding to said electronic image filing apparatus, wherein said predetermined apparatus identification is an identifier assigned to each of a plurality of electronic image filing apparatuses, and wherein each of said plurality of electronic image filing apparatuses has a different predetermined apparatus identifier;

an encoder operatively connected to said data identification generator for converting said data identification into an identification image pattern;

an electronic storage device operatively connected to said document management unit; and an image output device operatively connected to said document management unit, wherein in a registration mode output from said image output device comprises said identification image pattern superimposed on said image.

9. The electronic image filing apparatus of claim 8, wherein said electronic storage device is selected from the group consisting of a magnetic disk drive, a tape drive, a magneto-optical drive and a solid state information storage device.

10. The electronic image filing apparatus of claim 8, wherein said image output device is selected from the group consisting of a video display, a printer and a modem.

11. The electronic image filing apparatus of claim 8, wherein said image is an image of a document.

12. The electronic image filing apparatus of claim 8, further comprising a communication link between a first electronic image filing apparatus and a second electronic filing apparatus.

13. A method for electronically filing images, comprising converting an image to an electronic representation thereof;

storing said electronic representation on a filing apparatus;

assigning an identifier to said electronic representation, wherein said identifier comprises an image identifier corresponding to said image and a predetermined apparatus identifier corresponding to said filing apparatus, wherein said predetermined apparatus identifier is an identifier assigned to each of a plurality of apparatuses, wherein each of said plurality of apparatuses has a different predetermined apparatus identifier;

converting said identifier to an identifier code;

superimposing said identifier code on image information representative of a characteristic of said image; and outputting a registration sheet comprising said identifier code superimposed on at least a portion of said image, wherein said identifier can be obtained from said identifier code using a decoder.

14. The method of claim 13, wherein said step of converting comprises optical scanning.

15. The method of claim 13, further comprising supplying said electronic representation of said image to a second apparatus.

* * * * *